United States Patent
Seki

[15] 3,694,727
[45] Sept. 26, 1972

[54] INVERTER DEVICE
[72] Inventor: Nagataka Seki, Tokyo, Japan
[73] Assignee: Tokyo Shibaura Electric Company, Ltd., Kanagawa-ken, Japan
[22] Filed: Nov. 12, 1971
[21] Appl. No.: 198,200

[30] Foreign Application Priority Data
Nov. 14, 1970 Japan ..................... 45/100047

[52] U.S. Cl. .................................. 321/5, 321/45 C
[51] Int. Cl. ............................................. H02m 7/52
[58] Field of Search ........ 321/5, 45 C, 45 R; 318/227

[56] References Cited
UNITED STATES PATENTS

| | | | |
|---|---|---|---|
| 3,538,419 | 11/1970 | Seki et al. | 321/45 C |
| 3,582,757 | 6/1971 | Achinger | 321/45 R |
| 3,614,594 | 10/1971 | Rosa | 321/45 C |
| 3,628,126 | 12/1971 | Kawakami | 321/45 C |

FOREIGN PATENTS OR APPLICATIONS

| | | | |
|---|---|---|---|
| 1,488,233 | 4/1969 | Germany | 321/45 C |
| 1,513,964 | 10/1969 | Germany | 321/45 C |

*Primary Examiner*—William H. Beha, Jr.
*Attorney*—Norman F. Oblon et al.

[57] ABSTRACT

A thyristor bridge inverter is energized from a D.C. voltage supply through a switching thyristor. First and second commutation circuits, each having a series combination of a first commutation thyristor, a reactor and a second commutation thyristor, are connected in parallel with the series combination of the bridge inverter and the switching thyristor. A commutating condenser is connected at the interconnecting point between the reactor and the second commutation thyristor of the respective first and second commutation circuits and an interconnecting point between the bridge inverter and the switching thyristor. When commutation is intended among the thyristors provided in the bridge inverter, the first commutation thyristor of the first commutation circuit is turned on to thereby cause the switching thyristor to be biased negatively by the discharge of one of the commutation condensers. The second commutation thyristor of the second commutation circuit is then turned on to cause the bridge inverter to be biased negatively by the discharge of the other commutation condenser. Similarly, the first commutation thyristor of the second commutation circuit and the second commutation thyristor of the first commutation circuit are turned on when sequential commutation of the inverter is made. In this way, it is possible to turn on the second thyristor in one of the commutation circuits before the first thyristor in the other commutation circuit is turned off and without causing a short circuit across the D.C. voltage supply such that the deenergization period of the inverter from the D.C. voltage supply is effectively reduced during the commutation period of the inverter.

8 Claims, 6 Drawing Figures

INVENTOR.
NAGATAKA SEKI
BY Oblon, Fisher & Spivak
ATTORNEYS

INVERTER DEVICE

BACKGROUND OF THE INVENTION

1. Field of the Invention

The present invention relates to an inverter device having an improved commutation circuit.

2. Description of the Prior Art

As is well known, an inverter device is widely used as a variable and stepless speed control for an A.C. electric motor, such as an induction motor, a spinning motor or a paper mill drive motor and as an A.C. voltage supply having a relatively high output frequency. It is desired that the frequency range of the inverter device be as wide as possible in order that the same can be extended for use in many fields.

One example of such a prior art inverter device is disclosed in U.S. Pat. No.3,538,419, issued to Nagataka Seki, et al., on Mar. 20,1969, and assigned to the same assignee of the present invention. The inverter disclosed in this patent is provided with a single commutation circuit which includes a first thyristor connected in series between a D.C. voltage supply and a D.C. input of a thyristor bridge inverter to thereby cut off the D.C. input current to the inverter each time a commutation is intended between the thyristors provided in the inverter, a single commutation capacitor having a second thyristor connected in series therewith and being charged from the D.C. voltage supply through the first and second thyristors when both the first and the second thyristors are conductive at the same time, and a third thyristor having a reactor connected in series therewith and the same being conductive to apply a negative bias voltage to the first thyristor from the charged capacitor when turn-off of the first thyristor is intended and to cause the charged polarity of the capacitor to cooperate in reverse with the reactor such that the capacitor will be ready to apply a negative bias voltage to the thyristors of the inverter which have been conductive.

Thyristors generally require a certain turn-off time before conduction is completely extinguished. Thus, in accordance with the circuit arrangement described above, a turn-off time $t_1$ is required before the second thyristor can be ignited after the turn-off of the third thyristor in order to avoid a short circuit across the D.C. voltage supply due to the simultaneous conduction of the second and third thyristors. In addition, in the circuit arrangement described above, a turn-off time $t_2$ is necessary for enabling the main thyristors of the thyristor bridge inverter to turn off, while the second thyristor is conductive.

In such a circuit arrangement, during the time $t_1$ and $t_2$ the input to the inverter had to be unpreferably cut off, so that the load circuit thereof would not be supplied with electric power. Thus, by example, when the value of the turn-off time for an exemplary thyristor is 100 $\mu$sec, the unpreferable cut-off time $t_1 + t_2$ becomes 200 $\mu$sec. Therefore, if the output frequency of the three-phase fullwave bridge inverter is 200 Hz, a total of six outputless times of 200 $\mu$sec will occur within one 5 msec period of the same.

From the above, it is seen that because of the required cut-off of the inverter, the effective value of the elementary wave included in the output thereof is decreased to 78 percent in comparison with the ideal condition of $t_1 + t_2 = 0$. Moreover, under such conditions, the effective value of fifth harmonics remarkably increases and adversely influences the load circuit. In a three-phase inverter device third harmonics do not appear in the output thereof and the time $t_2$ required for turning off the main thyristors of the bridge inverter cannot be nullified to avoid a failure of commutation which may be caused by the simultaneous conduction of the main thyristors in the two arms of the bridge which are serially connected between the D.C. voltage supply lines. Thus, in order to improve the operation of the inverter device, a need existed to decrease or nullify the loss of time $t_1$ for the commutating period of the main thyristors.

In order to decrease the time $t_1$, it has been proposed to temporarily apply a reverse voltage to the third thyristor while turning on the second thyristor by providing an additional reactor which is electromagnetically linked with the present reactor and in series with the second thyristor. However, one problem with this circuit is that a voltage of four to five times as high as the D.C. source voltage will be applied to the second and third thyristors and thereby result in a breakdown of the same. Moreover, if a higher rated voltage thyristor is used, it will take a longer time to turn off the same. To obtain high rated voltage and short turn-off time thyristors is extremely expensive and therefore impractical.

SUMMARY OF THE INVENTION

Accordingly, it is an object of the present invention to provide a new and improved unique inverter device for enabling a shortened commutation time and for enabling the upper limit of the output frequency thereof to be increased.

Another object of the invention is to provide a new and improved unique inverter device which is capable of effectively increasing the fundamental wave component in the output thereof and at the same time to decrease the presence of fifth harmonics.

Still another object of the invention is to provide a new and improved unique and inexpensive inverter device which is capable of using relatively low rated voltage thyristors that can be easily obtained for use.

Briefly, in accordance with this invention, the foregoing and other objects are in one aspect attained by the provision of a first circuit having first and second commutation thyristors serially connected across a D.C. voltage source and a second circuit having third and fourth commutation thyristors serially connected across the D.C. voltage source. A main circuit which is disposed in parallel with the first and second circuits is provided and includes a fifth thyristor having a diode disposed in reverse parallel relationship and a thyristor bridge inverter connected serially thereto. First and second commutation energy accumulating means are provided and respectively include a series combination of a commutation condenser and a commutation reactor disposed respectively between the intermediate points of the first and second circuits and the connecting point of the fifth thyristor and the thyristor bridge inverter. In accordance with the above, the first and fourth commutation thyristors form a pair and the second and third commutation thyristor form a pair, which pairs are alternatively made conductive such that the first and third thyristors cause the electric charge of the corresponding condenser to discharge through the fifth thyristor to thereby turn it off and the second and fourth thyristors cause the electric charge of the corresponding condenser to discharge through the thyristor bridge inverter to turn it off each time a commutation is made among main thyristors provided in the thyristor bridge inverter.

BRIEF DESCRIPTION OF THE DRAWINGS

A more complete appreciation of the invention will be realized as the same becomes better understood by reference to the following detailed description when considered in connection with the accompanying drawings, wherein.

DESCRIPTION OF THE PREFERRED EMBODIMENTS

Figure 1:
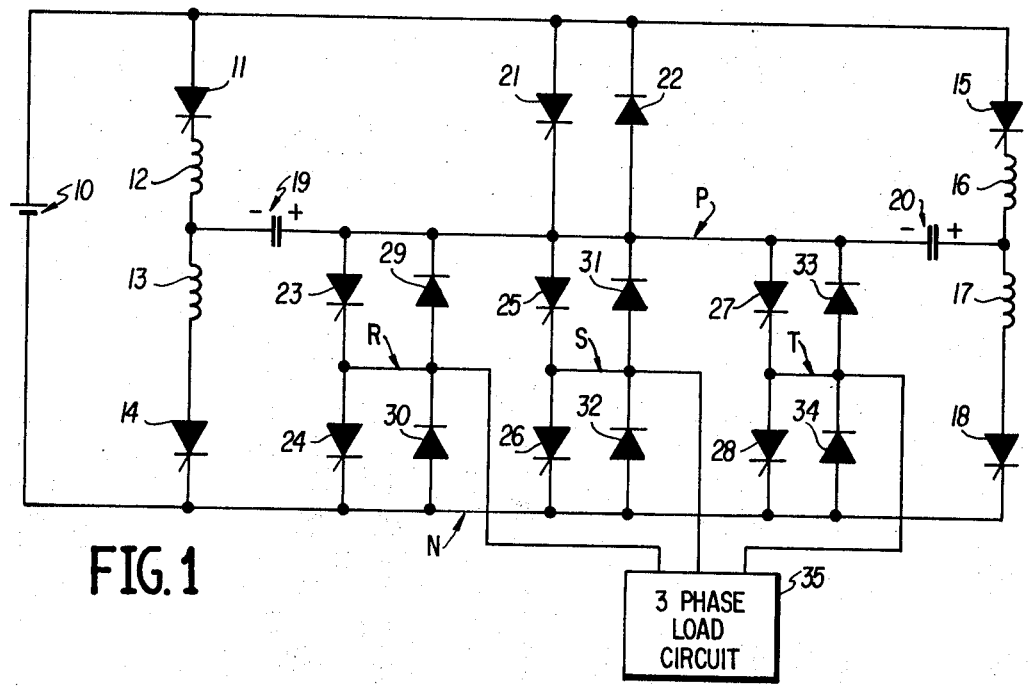
FIG. 1 is a circuit diagram of a 3-phase fullwave self excitation type bridge inverter device according to one preferred embodiment of the present invention.

Referring now to the drawings, wherein like reference numerals indicate identical or corresponding parts throughout the several views and more particularly to FIG. 1 thereof, wherein a self-excitation type 3-phase fullwave bridge inverter device according to the present invention is shown. In the inverter device, a D.C. source 10 is provided and the same may be operated at either a constant or a variable voltage. The positive terminal of the D.C. source 10 is connected to a positive bus P of the current inverting thyristor bridge through a thyristor 21 of illustrated polarity and a diode 22 which is connected parallel thereto and in opposite polarity. The negative terminal of the D.C. source 10 is connected to a negative bus N of the current inverting thyristor bridge. Between the positive terminal and the negative terminal of the D.C. source 10, there is formed a series circuit which consists of a first commutation thyristor 11 of indicated polarity a first commutation reactor 12, a second commutation reactor 13 and a second commutation thyristor 14 of indicated polarity. Similarly, between the positive terminal and the negative terminal of the D.C. source 10, there is formed another series circuit which consists of a third commutation thyristor 15 of indicated polarity, a third commutation reactor 16, a fourth commutation reactor 17 and a fourth commutation thyristor 18 of indicated polarity. A commutation condenser 19 is connected at a point between the commutation reactors 12 and 13 and the positive bus P of the thyristor bridge. A commutation condenser 20 is also connected at a point between the other commutation reactors 16 and 17 and the negative bus N of the thyristor bridge. The circuit arranged as described above is used for commutating the thyristors of the thyristor bridge.

Three circuits respectively having main thyristors 23 and 24, 25 and 26, and 27 and 28 of indicated polarity are disposed between the buses P and N of the thyristor bridge and are connected in parallel relationship. Feedback diodes 29 and 34 are provided and are respectively connected in reverse parallel relationship. Additionally, a 3-phase load circuit 35 is interposed among the cathode terminals R, S, and T of the main thyristors 23, 25 and 27.

The operation of the inverter device shown in FIG. 1 will now be described with further reference to FIGS. 2a to 2k. To start the operation of the inverter device, the commutation thyristors 14 and 15 are ignited to thereby charge the commutation condensers 19 and 20 to the illustrated polarity by the D.C. source 10. After the necessary charging has occurred, the commutation thyristors will turn off. Now, assume that the thyristor 21 is conductive, the main thyristors 23, 25 and 28 are conducting and the main thyristors 24, 26 and 27 are blocking. The process of commutating the current flowing through the main thyristor 23 to the main thyristor 24, can be explained as follows. The commutation thyristor 11 is first ignited and then the charge of the commutation condenser 19 is released through the path of the condenser 19, the thyristor 21, the thyristor 11, and then again the condenser 19. The thyristor 21 will be turned off when the discharging current increases to an amplitude substantially equal to the current which has passed through the thyristor 21. When about 1 volt of reverse voltage, which results from the forward drop of the diode 22 is applied to the thyristor 21, then the conduction of the thyristor 21 will completely cease. It should be understood that the discharging current is a pulse-like oscillating current which is determined by the condenser 19 and the reactor 12. The pulse-like oscillating current will decrease with the charging of the commutation condenser 19 in a polarity which is reverse to that of the illustrated one.

Additionally, the thyristor 18 is ignited to release the charge of the commutation condenser 20 of illustrated polarity through the path of the reactor 17, the thyristor 18, the diode 30, the main thyristor 23, and the commutation condenser 20; the path of the condenser 20, the reactor 17, the thyristor 18, the diode 32, the thyristor 25 and the condenser 20 and the path of the condenser 20, the reactor 17, the thyristor 18, the thyristor 28, the diode 53, and the condenser 20. The main thyristor 23, 25 and 28 are then turned off in accordance with the reverse current. Thereafter, the discharging current will continue to flow through the reverse and parallely disposed diodes 29, 31 and 34 and be decreased with the charging of the commutation condenser 20 which is of a polarity reverse to that of the illustrated one. It should be understood that when the charging current flows through the diodes 29 to 34, a reverse bias of about 1 volt, which results from the forward drop across each diode, will be applied to the main thyristors 23 to 28 and thereby prevent conduction of the same. Of course, the period of time selected for applying the reverse bias to the main thyristors is designed so as to be longer than the turn off time of recovery of the blocking state of the main thyristors 23, 25 and 28. Thus, the thyristors and the main thyristors will all remain blocked.

Accordingly, when the main thyristor 24 is ignited with the reignition of the thyristor 21 and the main thyristors 25 and 28, then commutation from the thyristor 23 to the thyristor 24 will be readily carried out.

After 1/6 period of time has elapsed, commutation from the main thyristor 28 to the main thyristor 27 will occur by igniting the commutation thyristor 15 to release the accumulated charge of the commutation condenser 20 (in this case, the charge of the commutation condenser 20 is of a polarity reverse to that of the illustrated one) through the path of the thyristor 21, the thyristor 15, the commutation reactor 15, the commutation reactor 16, and the commutation condenser 20. After the thyristor 21 is turned off, the discharging current will flow through the diode 22 which is disposed in a reverse parallel relationship with the thyristor 21. Thereafter, the main thyristors 24, 25 and 28 will turn off by igniting the commutation thyristor 14. Thus, a restart of the inverter device is carried out by reigniting the thyristor 21, the main thyristors 24 and 25 and igniting the main thyristor 27.

It should now be apparent that the circuit arrangement described above operates as a self-excitation type 3-phase bridge inverter device by alternatively igniting two pairs of commutation thyristors 11 and 18 and 14 and 15, every 1/6 period. The commutation thyristors 11,14,15 and 18 will turn off after the flow of a pulse-like conduction current is completed. The states of the commutation thyristors 11,14,15 and 18, respectively, are illustrated in FIGS. 2a to 2d and that of main thyristors 23 to 28 in FIGS. 2e to 2k.

As described hereinbefore, it should be clear that one of the pair of commutation thyristors, for example, the thyristor 18, may be ignited before the turning off of the other of the pair of thyristors, for example, the thyristor 11. Thus, for example, the thyristor 18 may be ignited during the period of conduction of the thyristor 11 without waiting for the turn-off time of the commutation thyristor 11. During this period, the simultaneous conduction of the commutation thyristors 11 and 18 or 15 and 14 will not cause a short circuit across the D.C. voltage supply 10.

Accordingly, the effective value of the fundamental wave included in the output waveform of the inverter device according to this invention can be enlarged and adverse influences to the output by fifth harmonics can be remarkably decreased. Moreover, with the present invention, the loss time of the outputless period is decreased to only the time required for turning off the thyristor 21.

Figure 3:
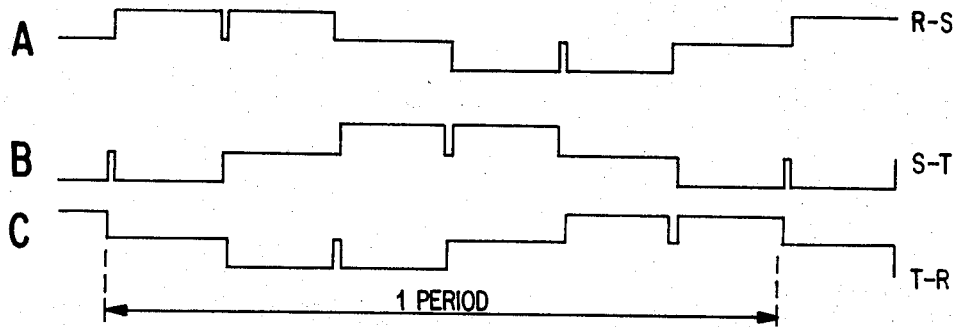
FIGS. 3a to 3c, respectively, show waveforms of the output of the embodiment of FIG. 1.

FIGS. 3a to 3c show the output waveforms between various pairs of output terminals of the 3-phase output. From the waveforms, it is seen that the width of the recess illustrated is decreased only for the period required for turning off the main thyristors. Thus, it is seen that the effective value of the fundamental wave included in the output waveform is enlarged and any adverse influence due to fifth harmonics is remarkably decreased. In fact, the upper limit to the output frequency of the inverter device of this invention is about two times that of the embodiment disclosed in the aforementioned U.S. Pat. No.3,538,419. In addition, since the rating voltage of the commutation thyristors used for the inverter device of this invention may be relatively low, the thyristors used therein can be inexpensively obtained.

Figure 4:
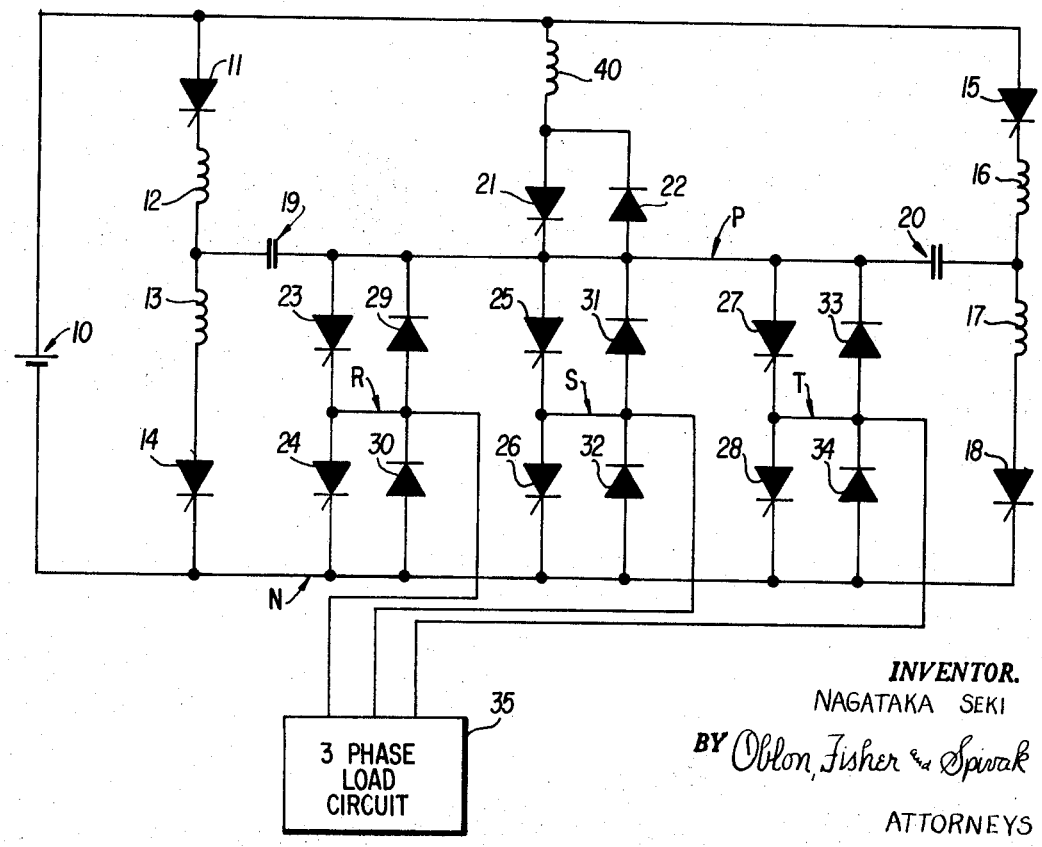
FIG. 4 is a circuit diagram of a 3-phase fullwave bridge inverter device according to another and alternative embodiment of the present invention.
Figure 2:
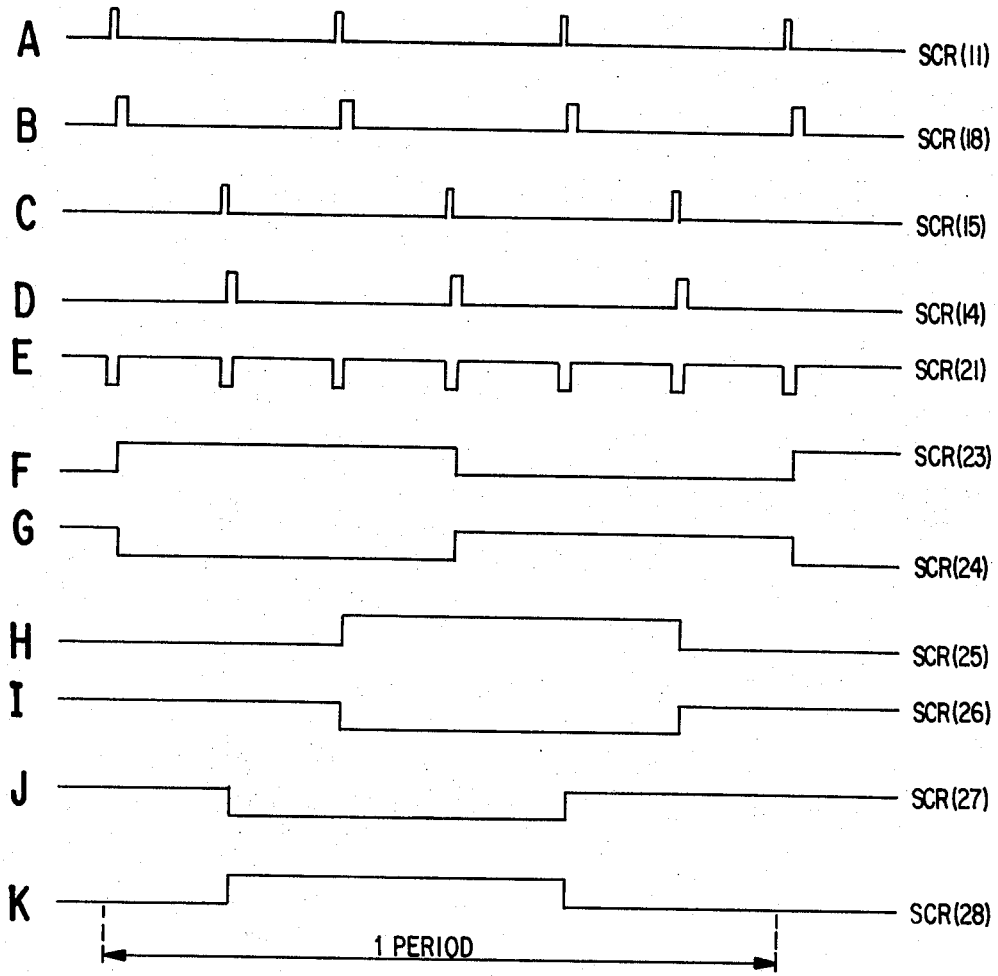
FIGS. 2a to 2k, respectively, show the conduction states of the current passing through the thyristors of the embodiment of FIG. 1.

FIG. 4 shows another and alternative embodiment of the present invention, wherein a reactor 40 is added and disposed between the D.C. source 10 and the thyristor 21 of the embodiment illustrated in FIG. 1. The reactor 40, whose reactance may be small, serves as a suppressing means against any increase in the voltage rising rate $dV/dt$.

Figure 5:
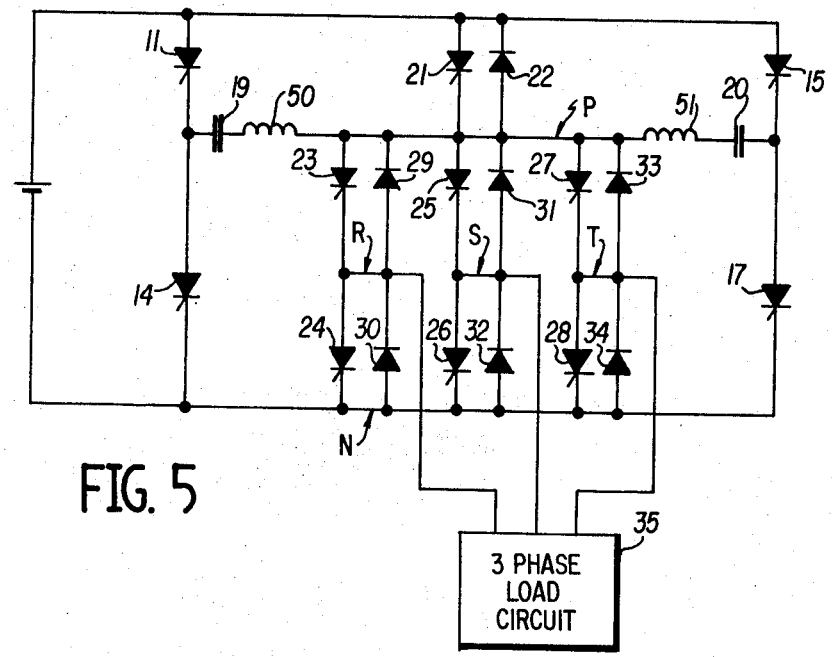
FIG. 5 is a circuit diagram of a 3-phase inverter device according to still another and alternative embodiment of the present invention; and, FIG. 6 is a circuit diagram of a 3-phase phase inverter device according to a still further and alternative embodiment of the present invention.

FIG. 5 shows still another and alternative embodiment of the present invention, wherein a series circuit of a commutation condenser 19 and a commutation reactor 50 is disposed between the connecting point of the commutation thyristors 11 and 14 and the positive bus P of the thyristor bridge inverter. A further series circuit of a commutation condenser 20 and a commutation reactor 51 is disposed between the connecting point of the thyristors 15 and 17 and the positive bus P of the thyristor bridge inverter. This simplified circuit arrangement is used when the D.C. source voltage is low and the voltage rising rate $dV/dt$ is small. The embodiment of FIG. 5 will function in a manner similar to that described for the embodiment in FIG. 1. It is seen that in FIG. 5 the number of reactors used is decreased and the reactance of the reactors used may be low.

Figure 6:
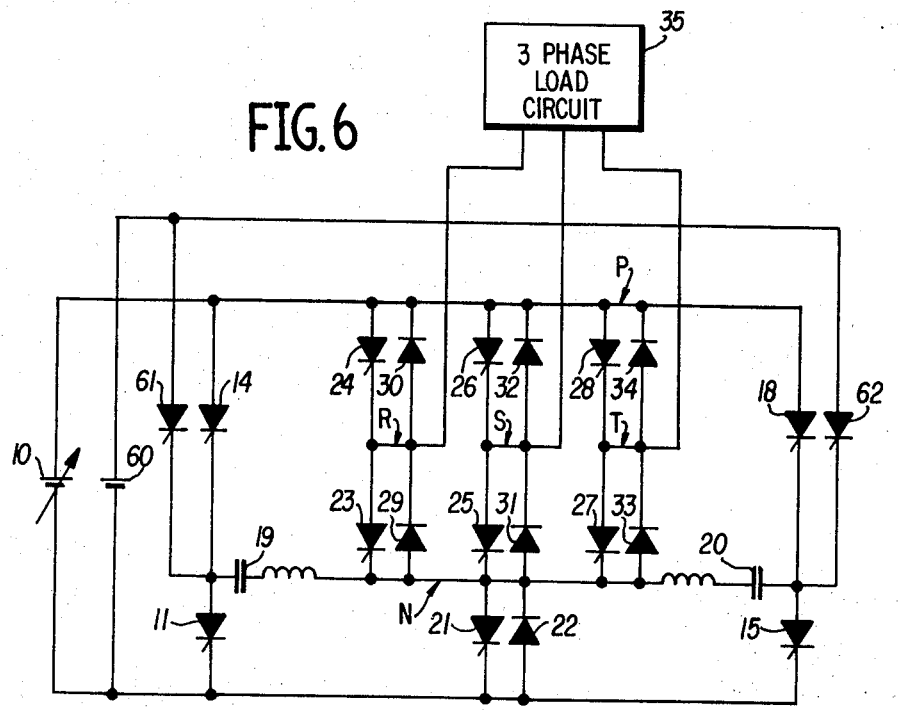

FIG. 6 shows a still further and alternative embodiment of the present invention. In this embodiment, the order of the thyristor 21 and the thyristor bridge are reversed to that shown in the abovementioned embodiments. In addition, thyristors 61 and 62 are added for supplying a primary charging current to the commutation condensers 19 and 20. The added thyristors 61 and 62 are connected to a separately provided D.C. source 60 and their operation is the same except for the primary charging of the commutation condensers from the additional constant D.C. voltage supply 60. In this embodiment, it is possible to charge the commutation condensers 19 and 20 with a high enough voltage to obtain a high commutation energy even where the relatively low input voltage is applied to the D.C. inputs of the bridge inverter from the variable D.C. voltage supply 10.

Obviously, numerous modifications and variations of the present invention are possible in light of the above teachings. Thus, although the above-described embodiments are all three-phase inverters, it is apparent that the present invention is applicable to a single phase or other multiphase inverter devices. For example, a single phase thyristor bridge inverter would include four bridge connected thyristors and four feedback diodes which would be respectively connected to the main thyristors and in reverse parallel relationship. The operation for commutating the main thyristors would be similar to that of the 3-phase inverter device.

It is therefore to be understood that within the scope of the appended claims, the invention may be practiced otherwise than as specifically described herein.

What is claimed as new and desired to be secured by letters patent of the united states is:

1. An inverter device comprising:
 A D.C. voltage source;
 a first circuit having first and second commutation thyristors serially connected across said D.C. voltage source;

a second circuit having third and fourth commutation thyristors serially connected across said D.C. voltage source;

a main circuit disposed in parallel with said first and second circuits and including a fifth thyristor having a diode disposed in reverse parallel relationship and a thyristor bridge inverter connected serially thereto;

a first and second commutation energy accumulating means respectively including a series combination of a commutation condenser and a commutation reactor disposed respectively between the intermediate points of said first and second circuits and the connecting point of the fifth thyristor and the thyristor bridge inverter, whereby the first and fourth commutation thyristors form a pair and the second and third commutation thyristors form a pair, which pairs are alternatively made conductive such that the first and third thyristors cause the electric charge of the corresponding condenser to discharge through said fifth thyristor to thereby turn it off, and the second and fourth thyristors cause the electric charge of the corresponding condenser to discharge through said thyristor bridge inverter to turn it off each time a commutation is made among main thyristors provided in said thyristor bridge inverter.

2. An inverter device according to claim 1, wherein said thyristor bridge inverter is made up of bridge connected main thyristors and feedback diodes which are respectively connected to the main thyristors in a reverse parallel relationship.

3. An inverter device according to claim 1, wherein each of said first and second commutation energy accumulating means comprises first and second commutation reactors disposed between a specific one of said two serially connected commutation thyristors and a commutation condenser connected between an intermediate point of the first and second commutation reactors and the connecting point of the fifth thyristor and a D.C. input of the thyristor bridge inverter.

4. An inverter device according to claim 1, wherein each of said first and second commutation energy accumulating means comprises a series circuit of a commutation reactor and a commutation condenser disposed between an intermediate point of a respective one of said two serially connected commutation thyristors and the connecting point of the fifth thyristor and a D.C. input of the thyristor bridge inverter.

5. An inverter device according to claim 1, wherein said main circuit is further provided with a reactor connected between the fifth thyristor and the D.C. voltage source.

6. An inverter device according to claim 1, wherein each of the first and second commutation accumulating means is further provided with a supplementary D.C. voltage source of a relatively constant voltage and two thyristors disposed between the supplementary D.C. voltage source and an intermediate point of each of the two serially connected commutation thyristors to charge said commutation condensers.

7. An inverter device according to claim 3, wherein the thyristor bridge inverter is a single phase circuit comprising four bridge connected main thyristors and four feedback diodes which are respectively connected to the main thyristors in a reverse parallel relationship.

8. An inverter device according to claim 3, wherein the thyristor bridge inverter is a 3-phase circuit comprising six bridge connected thyristors and six feedback diodes which are respectively connected to the main thyristors in a reverse parallel relationship.

* * * * *